US011942063B2

(12) United States Patent
Vukasinovic et al.

(10) Patent No.: US 11,942,063 B2
(45) Date of Patent: Mar. 26, 2024

(54) REED PLATE FOR A HAND-PULLED INSTRUMENT, SOUND POST FOR A HAND-PULLED INSTRUMENT, AS WELL AS HAND-PULLED INSTRUMENT

(71) Applicant: Carboneon GmbH, Winterthur (CH)

(72) Inventors: Srdjan Vukasinovic, Wintherthur (CH); Patrick Read, Bolligen (CH); Christian Brauner, Villnachern (CH); Jan Hess, Lenzburg (CH)

(73) Assignee: Carboneon GmbH, Winterthur (CH)

( * ) Notice: Subject to any disclaimer, the term of this patent is extended or adjusted under 35 U.S.C. 154(b) by 0 days.

(21) Appl. No.: 17/882,732

(22) Filed: Aug. 8, 2022

(65) Prior Publication Data

US 2023/0045670 A1 Feb. 9, 2023

(30) Foreign Application Priority Data

Aug. 9, 2021 (EP) .................................... 21190420

(51) Int. Cl.
*G10D 11/02* (2006.01)

(52) U.S. Cl.
CPC .................................... *G10D 11/02* (2013.01)

(58) Field of Classification Search
CPC ...................................................... G10D 11/02
See application file for complete search history.

(56) References Cited

U.S. PATENT DOCUMENTS

| | | | | |
|---|---|---|---|---|
| 2,276,884 A * | 3/1942 | Scott | G10B 3/08 84/363 |
| 2,640,384 A * | 6/1953 | Miessner | G10D 11/02 84/376 R |
| 5,655,898 A * | 8/1997 | Hashimoto | F04B 39/1073 137/856 |
| 2023/0045670 A1* | 2/2023 | Vukasinovic | G10D 11/02 |

FOREIGN PATENT DOCUMENTS

| | | | | |
|---|---|---|---|---|
| AT | 521201 B1 * | 11/2020 | G10D 11/02 |
| CH | 715803 A1 * | 7/2020 | G10D 11/02 |
| CH | 715803 B1 * | 8/2020 | G10D 11/02 |
| DE | 102018128326 A1 | 5/2020 | |
| EP | 3855424 A1 | 7/2021 | |
| WO | 8604443 A1 | 7/1986 | |

OTHER PUBLICATIONS

Search Report for European Patent Application No. 21 190 420.6, dated Jan. 26, 2022, 18 pages.
Office Action for European Patent Application No. 21 190 420.6, dated Jun. 30, 2022, 14 pages.

* cited by examiner

*Primary Examiner* — Robert W Horn
(74) *Attorney, Agent, or Firm* — Westman, Champlin & Koehler, P.A.

(57) ABSTRACT

A hand-pulled instrument, such as an accordion, typically has a sound post (or reed post) on which several reed plates are mounted. The reed plate usually has two oblong openings. Each opening relates to an elongated reed, which is widened at one of its two longitudinal ends for attachment to the reed plate. The opposite long end of the reed is not (Continued)

further fixed. The reed can be made to vibrate in a way that it partially swings into the associated opening. If air flows through the opening, in particular, due to a movement of a bellows of the hand-pulled instrument, such vibration can be generated, and in this way, an audible tone is produced. The reeds are usually attached to the reed plate with a rivet.

13 Claims, 5 Drawing Sheets

REED PLATE FOR A HAND-PULLED INSTRUMENT, SOUND POST FOR A HAND-PULLED INSTRUMENT, AS WELL AS HAND-PULLED INSTRUMENT

This application claims priority to European Application No. 21 190 420.6, filed on Aug. 9, 2021, the content of which is hereby incorporated by reference in its entirety.

The invention relates to a reed plate for a hand-pulled instrument, a sound post for a hand-pulled instrument, and a hand-pulled instrument.

A hand-pulled instrument, such as an accordion, typically has a sound post (or reed post) on which several reed plates are mounted. The reed plate usually has two oblong openings. Each opening relates to an elongated reed, which is widened at one of its two longitudinal ends for attachment to the reed plate. The opposite long end of the reed is not further fixed. The reed can be made to vibrate in a way that it partially swings into the associated opening. If air flows through the opening, in particular, due to a movement of a bellows of the hand-pulled instrument, such vibration can be generated, and in this way, an audible tone is produced. The reeds are usually attached to the reed plate with a rivet.

A reed plate for a hand-pulled instrument is known which is made of aluminum alloy and a reed made of spring steel.

When the ambient temperature changes, the dimensions of the reed and also those of the reed plate change. For this reason, firstly, there can be changes in the pitch of the sound made by the vibrating reed due to the changes in the temperature, and secondly, due to the different expansion coefficients of steel and aluminum, the reeds at sub-zero temperatures can become jammed thus making the hand-pulled instrument or the accordion unplayable for the moment and potentially the instrument can become damaged permanently. These problems of course are regularly not desirable in practice and they make themselves basically more noticeable the greater the temperature fluctuation are.

Due to different expansion coefficients, daily temperature differences cause recurring stresses between aluminum and steel, which contribute to a slow detuning of the accordion, so that an accordion on average must be tuned every five years in a complex and costly process by a specialist.

Therefore, there is a need for a hand-pulled instrument with improved playability and/or less maintenance.

This objective is achieved through the presented invention by the subject matter of the independent claim. Advantageous configurations with appropriate developments of the invention are specified in the dependent claims, with configurations of an aspect of the invention with mutually advantageous configurations regarding other aspects of the invention to be considered.

According to a first aspect of the invention, a reed plate for a hand-pulled instrument is provided, with at least one reed fixed to the reed plate and wherein the reed plate and the reed respectively comprise a carbon fiber composite material. In particular, the reed plate and/or the reed can be formed from the carbon fiber composite material.

By choosing the material specified in this way for the reed and the reed plate, it can be achieved that the dimensions of the reed and the reed plate change with changing temperaturesless as compared to the above-mentioned prior alt. In this way, the vibration of the reed can be improved regarding pitch stability and/or frequency stability. This effect is due to the fact that the dimensions of a component made of carbon fiber composite material change significantly less with changing temperatures than the dimensions of a corresponding part made of spring steel or aluminum.

As an extreme example, tests have shown that a suitably designed carbon fiber composite reed material that operates at the ambient temperature of 50° C. with a frequency of 1641 Hz, at an ambient temperature of 30° C. also oscillates at 1641 Hz. In contrast, a reed made of steel at 50° C. oscillates with a similar frequency (1670 Hz), however, not at all at −30° C.

In addition, it has been found that the choice of the material mentioned can generate a musically very advantageous overtone behavious. In particular, tones that are particularly rich in overtones can be generated. Sounds like that are usually perceived by a listener as particularly pleasant. For example, it has been found that compared to a corresponding steel reed, the third overtone (i.e. the tone two octaves above the fundamental tone) is particularly prominent. Noise between the overtones is practically imperceptible.

It should also be mentioned that this choice of material decreases the risk of corrosion of the reed and/or reed plate. This is an advantage concerning the life of the reed plate and the reed itself and thus to the working life of a suitably equipped hand-pulled instrument.

The reduction of temperature-dependent stresses between materials of the reed and reed plate, which is achieved through the use of temperature-stable carbon fiber composite material achieved in reed plates and/or reeds can reduce or eliminate the detuning of the instrument and thus minimizes the maintenance cost and effort.

Furthermore, it is also an advantage that carbon fiber composite material is lighter than aluminum or steel. The usage of the previously mentioned material can reduce the weight of the reed and the reed plate by more than 50% since a considerable number of reed plates and reeds in a common reed instrument have a considerable influence on the total weight that the instrument may have.

According to the prior art, the free end of the reed is usually bent away from the reed plate. In this way, a so-called "release gap" is formed for the emergence of the vibration through a corresponding air flow, i.e. "reed response" is important for that. However, this is problematic if the reed is made of carbon fiber composite material because this material practically cannot be bent accordingly. It is therefore advantageous if the reed plate is shaped in a region surrounding the free end of the reed in such a way that a suitable release gap is fomed, even if the reed is made of carbon fiber composite material, more generally, in case of a reed which only extends in one plane. In this sense, the reed plate particularly comprises a planar support area, extending in a plane for connection with the reed, and an opening to allow a vibration of the reed, wherein the opening extends from the support area along a longitudinal axis to an edge area opposite to the support area. Here, the reed plate is shaped in such a way that a distance is formed between the plane and the edge area in a direction perpendicular to the plane.

The opposite edge area of the opening preferably extends transversely, in particular perpendicularly to the longitudinal axis.

The distance thus formed is advantageously selected in dependence on the desired height of the sound that is to be produced by the vibration of the reed. The higher the tone, the smaller the release gap is generally advantageously selected. Also, it is possible to choose the distance depending on the stiffness of the reed. A lower rigidity of the reed is beneficial in terms of reed response, a higher rigidity generally makes it more difficult to respond, but it has an advantage regarding the voice and frequency stability and also regarding the achievable volume.

Therefore, the distance is preferably at most 1.5 mm, particularly preferably 1.3 mm, for example, at most 1.0 mm. Furthermore, the distance is preferably at least 0.05 mm, more preferably at least 0.1 mm, for example at least 0.3 mm.

A simple possibility for the production and formation of the release gap is given when a surface of the reed plate facing the reed comprises a recess and/or a curvature and/or an inclination to form the distance. The curvature can, for example, be convex.

A particularly good response of the reed can be made possible if the mentioned recess, curvature, or inclination of the surface of the reed plate is formed within in the last third of the opening, i.e. in the region of the third of the opening which adjoins the edge area opposite the support area.

As mentioned above, according to prior art manufacturing, the reed is connected to the reed plate by a riveted connection. As briefly described at the beginning, a reed typically has a widened end area, which is in contact with a corresponding flat support area of the reed plate. Extensive investigations have shown that if the reed is attached by a rivet connection, the widened end area of the reed also vibrates to a certain extent. This has a disadvantageous effect because it causes deviations from the desired target frequency. Appropriate experiments have shown, for example, that a reed with a target frequency of 448 Hz can occur due to the quasi "punctiform" riveted connection in practice to vibration with a frequency of 393 Hz.

Therefore, the reed preferably has a first region and a second region, wherein the first region of the reed is screwed to the reed plate and the second region extends parallel to the longitudinal axis. By the screw connection, a particularly large-scale fixation of the reed on the reed plate can advantageously achieved. If the entire widened end area of the reed is fixed on the reed plate, this is particularly advantageous with respect to achieving the desired target frequency.

A correspondingly advantageous large-scale connection of the end of the reed with the contact area of the reed plate can be alternatively achieved, for example, by soldering, gluing, or large-area riveting.

In this sense, it is an advantage if the first region of the reed is connected in such a way to the reed plate, in particular screwed, that the first region of the reed is in contact with the support area of the reed plate in a planar manner.

Due to the above relationships, it is particularly advantageous if the first region of the reed has a width measured transversely to the longitudinal axis, wherein the first region of the reed is pressed over at least 50%, preferably over at least 70%, particularly preferably over at least 90% of the width to the reed plate.

The reed plate and the reed are particularly preferably made of the same material.

At least two reeds are preferably attached to the reed plate. That is an advantage because there are typically two separate reeds for each note of a hand-pulled instrument, one for air flow due to traction of the bellows and one for air flow due to compression of the bellows.

According to a further aspect of the invention, a sound post for a hand-pulled instrument is provided. There are several reed plates according to the present invention attached to the sound post.

The sound post preferably comprises a carbon fiber composite material. In particular, the sound post can be made of a carbon fiber composite material. Particularly preferably, the reeds, the reed plates, and the sound post are made of the same material.

According to a further aspect of the invention, a hand-pulled instrument, in particular an accordion is provided comprising several reed plates and/or a sound post according to the application.

In particular, the present application includes the following aspects:

1. A reed plate for a hand-pulled instrument, comprising:
   - a planar support area extending in a plane for connection to the reed, and
   - an opening to allow a vibration of the reed, wherein the opening extends from the support area along a longitudinal axis up to an edge area of the opening opposite tothe support area,
   - wherein the reed plate and/or the reed/are shaped in such a way that a distance is formed between the plane and the edge area in a direction perpendicular to the plane.
2. The reed plate according to aspect 1, wherein the reed plate comprises a carbon fiber composite material, particularly wherein the reed plate is made from a carbon fiber composite material.
3. The reed plate according to aspect 1 or 2, wherein the distance is at most 1.5 mm, preferably at most 1.3 mm, particularly preferably at most 1.0 mm.
4. The reed plate according to any one of the preceding aspects, wherein the distance is at least 0.05 mm, preferably at least 0.1 mm, particularly preferably at least 0.3 mm.
5. The reed plate according to any one of the preceding aspects, wherein a g surface of the reed plate facing the reed comprises a recess and/or a curvature and/or an inclination to form the distance.
6. A reed plate arrangement for a hand-pulled instrument, comprising:
   - a reed plate according to any one of the preceding aspects and
   - a reed connected to the support area of the reed plate.
7. The reed plate arrangement according to aspect 6, wherein the reed is connected to the support area of the reed plate in a planar manner.
8. The reed plate arrangement according to aspect 6 or 7, wherein the reed is connected to the support area of the reed plate via a large-area rivet connection, a screw connection, an adhesive connection, or a soldered joint in a planar manner.
9. The reed plate arrangement according to one of aspects 6 to 8, in which the reed comprises a carbon fiber composite material, particularly, in which the reed is made from a carbon fiber composite material.
10. A sound post arrangement for a hand-pulled instrument, comprising:
    - a sound post and
    - a reed plate arrangement according to any one of aspects 6 to 9, wherein the reed plate arrangement is attached to the sound post, for example via a wax connection.

11, The sound post arrangement according to aspect 10, wherein the sound post is formed from plastic or wood.

12. The sound post arrangement according to aspect 11, wherein the sound post is formed from plastic employing 3D printing.

13, A reed plate arrangement for a hand-pulled instrument, comprising a reed plate and a reed, the reed plate having:
   - a planar support area extending in a plane for connection to the reed and an opening to allow a vibration of the reed wherein the opening extends from the support area along a longitudinal axis up to an edge area of the opening opposite to the support area, particularly a reed plate arrangement according to one of aspects 6 to 9, wherein the reed is attached to the support area of the reed plate in a planar manner, particularly, via a screw connection, a large-scale rivet connection, an adhesive bond, or a soldered joint.

In principle, tones can be produced with reeds made of different materials with different sound qualities. So a sound post, for example with steel reeds and with additional reeds of carbon fiber composite material may be provided. The possibility of generating tones with different sound qualities with a hand-pulled instrument is principally musically desirable. A cassotto, for example, also takes care that the sound gets warmer when using a sound post in the cassotto.

The carbon fiber composite material can be carbon, for example.

Use of at least one sound post made of carbon with carbon reed plates and reeds made of carbon and at least one sound post made of carbon reed plates and steel reeds or another combination of at least one conventional sound post, as described above, allows a completely newly equipped hand-pulled instrument. This can be advantageous, for example, when temperature-related expansion behavior is practically irrelevant, or for example, because it is only played indoors. This can also be related to the cost of the hand-pulled instrument since carbon is generally more expensive than aluminum alloys or spring steel. In addition, a sound can be special in this way and be "personalized" individually to the preferences of a musician, to suit the music to be able to do justice to the taste of the musician in a particularly suitable way.

If the reed block is made of plastic or wood, this is an advantage in terms of manufacturing costs. In addition, in this way, a particularly large variety of sounds can be achieved. This applies to the hand-pulled instrument or accordion as such, but also concerning the variety of sounds between different accordion models. In addition, there is a personalized variety of sounds depending on the taste of a musician.

Further advantages, features, and details of the invention result from the following description of a preferred embodiment and from the figures. The features mentioned above in the description and combinations of features and those mentioned below in the description of the figures and/or features and feature combinations shown alone in the figure are not only in the combinations specified in each case but also in other combinations or can be used alone without departing from the scope of the invention.

Figure 1:
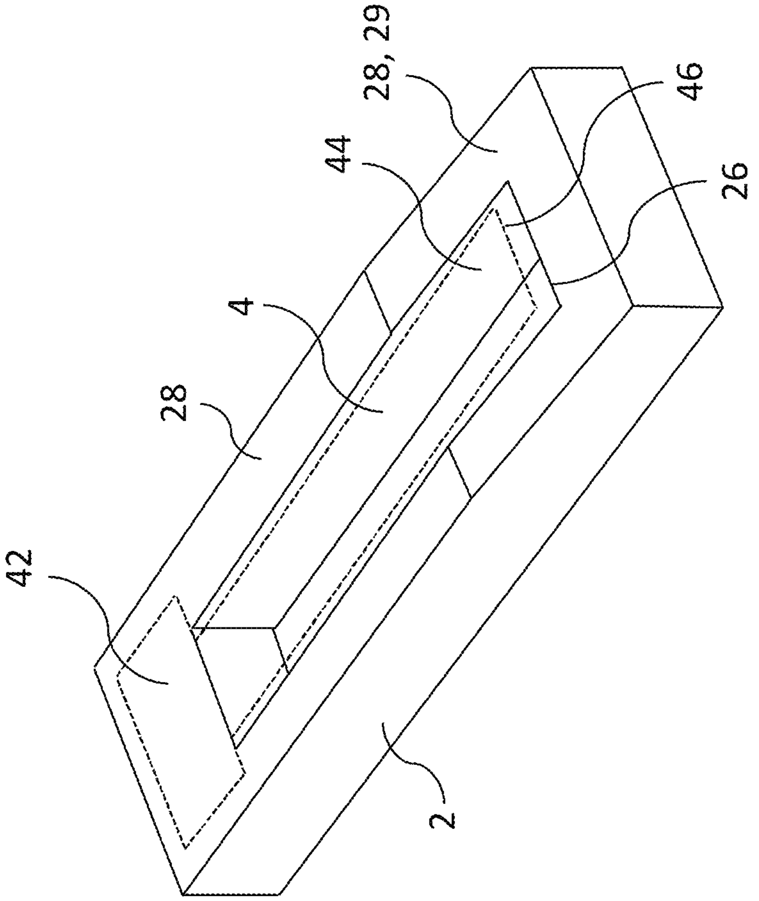
FIG. 1 shows a schematic perspective sketch of an inventive reed plate, with a sketch of an associated reed.

FIG. 1 shows a schematic perspective sketch of an inventive reed plate 2 for a hand-pulled instrument. The hand-pulled instrument can be, for example, an accordion. On the reed plate 2—as dotted indicated in FIG. 1—a reed 4 can be attached. The reed plate 2 preferably comprises a carbon fiber composite material. The carbon fiber composite material can, for example, be carbon. For example, the reed plate 2 is formed from the carbon fiber composite material.

The reed 4 preferably also comprises carbon fiber composite material. The carbon fiber composite material can in turn be, for example, carbon. For example, the reed 4 can be formed from the carbon fiber composite material. In particular, it can be provided that the reed plate 2 and the reed 4 consist of the same material.

Figure 2:
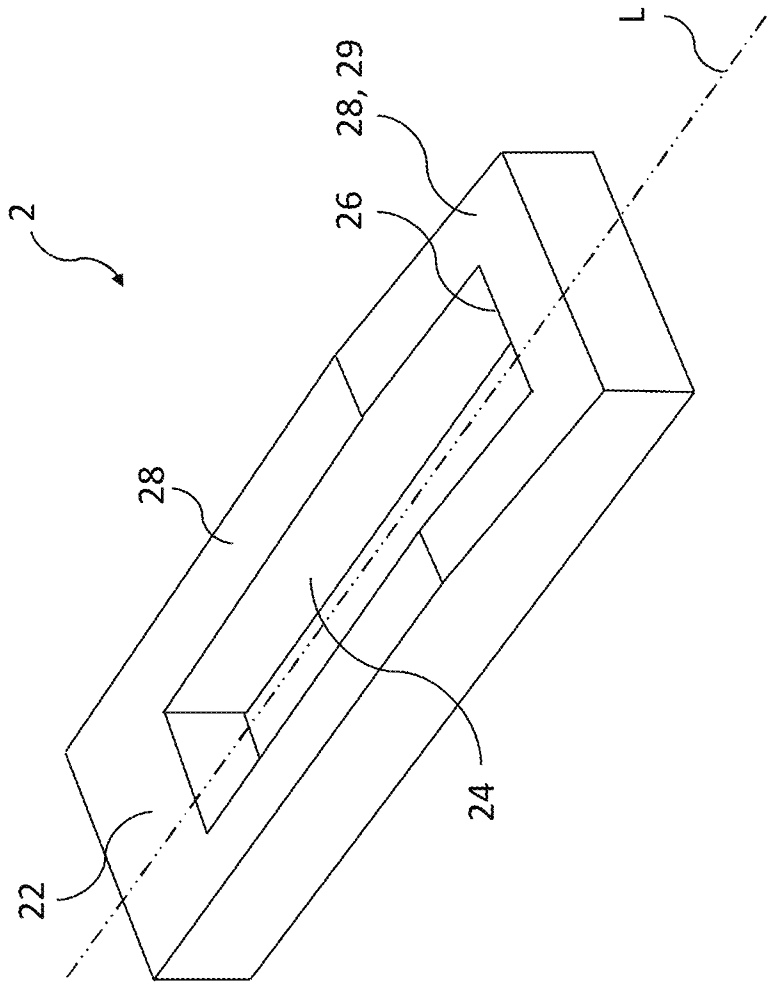
FIG. 2 shows a corresponding sketch without the reed.
Figure 3:
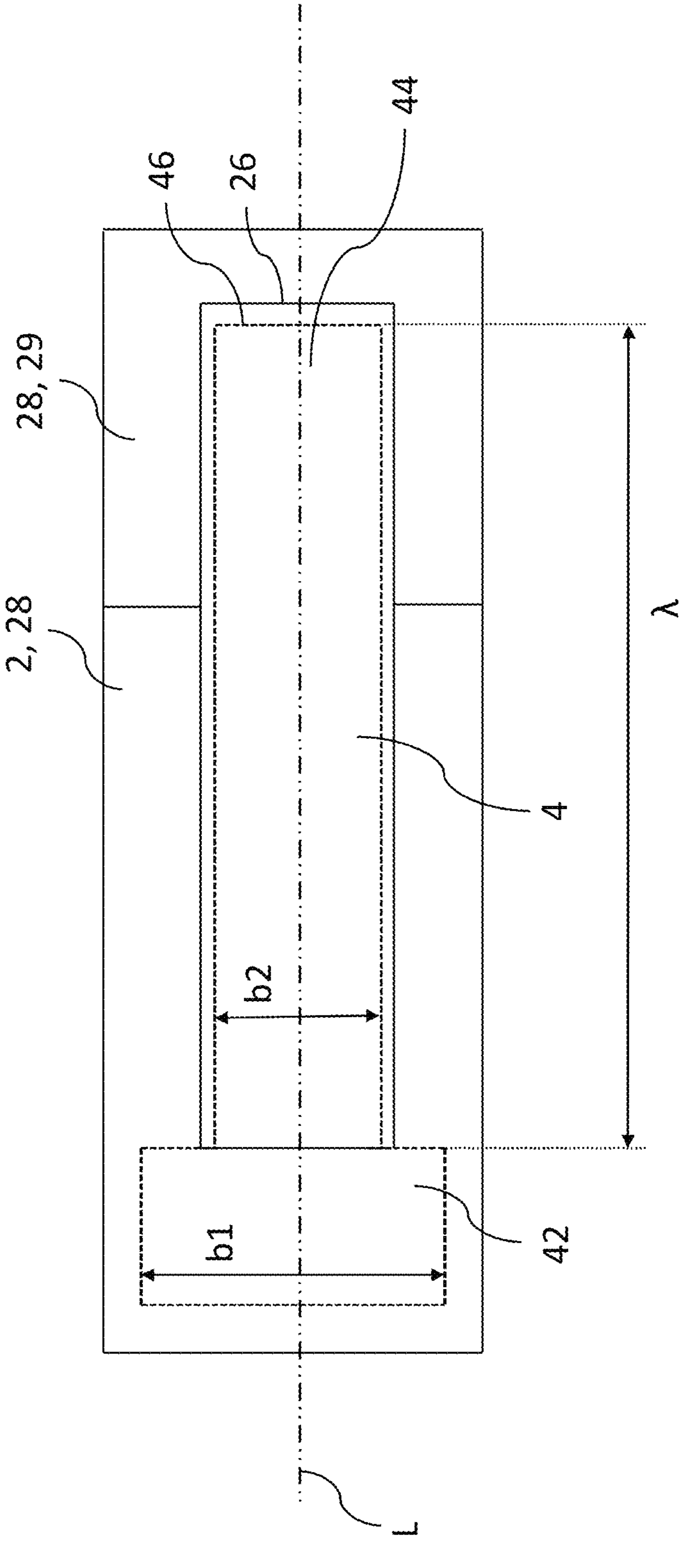
FIG. 3 shows a sketch of a corresponding plan view of the reed plate.
Figure 4:
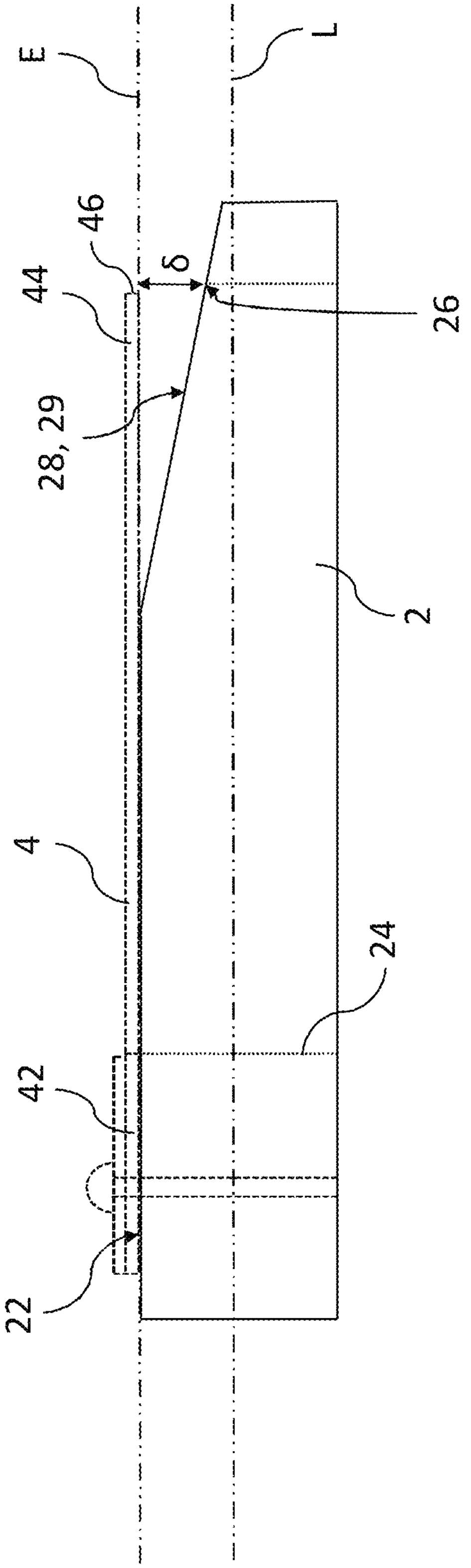
FIG. 4 shows a sketch of a corresponding side view of the reed plate.

FIG. 2 shows a corresponding sketch of the reed plate 2 without the reed, FIG. 3 shows a sketch of a corresponding plan view of reed plate 2. FIG. 4 shows a sketch of a corresponding side view of reed plate 2 with reed 4. Reed plate 2 has a planar support area 22 extending in a plane E for connection to the reed 4. Further, the reed plate 2 has an opening 24 to enable a vibration of the reed 4. The shape of the opening 24 is preferably adapted to the shape of the reed 4. Viewed in a section parallel to the plane E, the opening 24 has particularly a rectangular cross-section.

By an airflow through the opening 24, particularly generated by a movement of a bellows of a hand-pulled instrument equipped with the reed plate 2, the reed 4 connected to the reed plate 2 can be induced to vibrate to produce a sound. The opening 24 of the reed plate 2 preferably extends directly from the support area 22 along a longitudinal axis L up to an edge area 26 opposite to the support area 22. The edge area 26 is particularly straight and perpendicular to the longitudinal axis L.

The reed 4 is designed flat overall and extends in a plane parallel to the plane E. As can be seen from the example in FIG. 3, the reed 4 has a first region 42 and a second region 44. The second region 44 extends preferably immediately starting from the first region 42 longitudinally parallel to the longitudinal axis L to an opposite edge area 46 of the reed 4.

The first region 42 of the reed 4 can have a substantially rectangular shape and the second region 44 can also be substantially rectangular in shape. However the first region 42 is preferably broadened as measured transversely to the longitudinal axis L in comparison to the second area 44 (cf. FIGS. 1 and 3). Particularly, the first region 42, as shown in FIG. 3 shows a first width hl measured transversely to the longitudinal axis L and the second region 44 of the reed 4 shows a second width b2, measured transversely to the longitudinal axis L, which is smaller than the first width b1.

The second region 44 of the reed 4 can extend along the longitudinal axis L and further extend as the first region 42. The second region 44 has, a measured length λ along the longitudinal axis L, which particularly depends on the desired target frequency, the modulus of elasticity and the selected density.

The first region 42 of the reed 4 is connected to the reed plate 2, particularly, screwed or glued or soldered to the reed plate 2. The first region 42 is connected to the reed plate 2 in such a way that it contacts the support area 22 of the reed plate 2 over a large area. The first region 42 is advantageously pressed to the support area 22 of the reed plate 2 over at least 50%, preferably over at least 70% and more preferably over at least 90% of its width b1.

The reed plate 2 is shaped such that—as outlined in FIG. 4—a distance δ in a direction perpendicularly to the plane E is formed between the plane E and the edge region 26. This distance δ corresponds at least essentially to the so-called "release gap" so that an opening is formed between the edge area 46 of the reed 4 and the edge area 26 of the opening 24, Particularly, the size of the distance δ influences the response of the reed 4 on airflow through the opening 24, so the time between the beginning of the airflow and the formation of the audible tone.

To form the distance δ the reed plate 2 comprises a surface 28 facing the reed 4 which shows a convex curvature and/or an inclination 29. In the illustrated preferred embodiment, the surface 28 is provided with an inclination 29 which directly adjoins the planar section of the surface 28 via an edge. Alternatively, however, a curved transition area may be present or the right portion of the surface 28 may show an overall convex curvature.

The distance δ or the size of the release gap is preferably depending on the desired target frequency and the stiffness of the chosen reed 4. The distance δ is preferably at most 1.5 mm, particularly preferably at most 1.3 mm, for example, at most 1.0 mm. Furthermore, the distance δ is preferably at least 0.05 mm, particularly preferably at least 0.1 mm, for example at least 0.3 mm.

Contrary to what is sketched in the figures, the reed plate can have more than one opening. For example, a reed plate can be provided with two openings, where each opening is provided for one reed, respectively. Accordingly, the reed plate is preferably connected to two reeds, designed with the formation of reeds and their connections to the reed plate in the sense of the above description.

Figure 5:
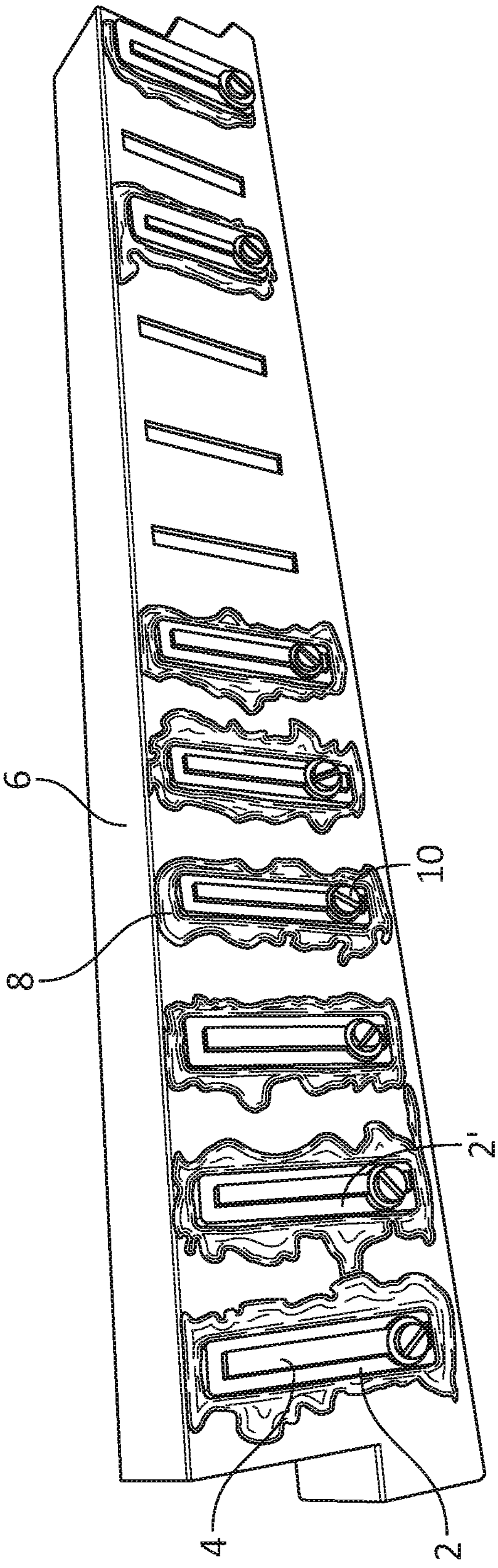
FIG. 5 shows a schematic representation of a sound post according to the application.

FIG. 5 shows a schematic representation of a sound post 6 according to the invention. The sound post 6 has several reed plates 2, 2' according to the invention. The reed plates 2, 2' are preferably connected to the sound post 6 with a wax 8. Furthermore, screws 10 can be seen with which the reeds 4 are attached to the reed plates 2, 2' in a plane manner.

The invention claimed is:

1. A reed plate arrangement for a hand-pulled instrument, wherein at least one reed is fixed to a reed plate and wherein the reed plate and the reed respectively comprise a carbon fiber composite material, the reed plate comprising:

a planar support area extending in a plane for connection to the reed, and an opening to allow a vibration of the reed, wherein the opening extends from the support area along a longitudinal axis up to an edge area of the opening opposite to the support area, wherein the reed plate is shaped in such a way that a distance is formed between the plane and the edge area in a direction perpendicular to the plane.

2. The reed plate arrangement according to claim 1, wherein the distance is at most 1.5 mm.

3. The reed plate arrangement according to claim 1, wherein the distance is at least 0.05 mm.

4. The reed plate arrangement according to claim 1, wherein a surface of the reed plate facing to the reed comprises a recess and/or a curvature and/or an inclination to form the distance.

5. The reed plate arrangement according to claim 1, wherein the reed comprises a first region and a second region, wherein the first region of the reed is screwed to the reed plate and the second region extends parallel to the longitudinal axis.

6. The reed plate arrangement according to claim 5, wherein the first region of the reed is screwed to the reed plate in such a way that the first area of the reed contacts the support area of the reed plate in a planar manner.

7. The reed plate arrangement according to claim 6, wherein the first region of the reed has a width measured transverse to the longitudinal axis and the first region of reed is pressed against the reed plate over at least 50% of the width.

8. The reed plate arrangement according to claim 1, wherein the reed plate and the reed are made from the same material.

9. The reed plate arrangement according to claim 1, wherein at east two reeds are attached to the reed plate.

10. A sound post for a hand-pulled instrument, wherein several reed plate arrangements are attached to the sound post, the several reed plate arrangements comprising:

a reed plate for a hand-pulled instrument, wherein at least one reed is fixed to the reed plate and wherein the reed plate and the reed respectively comprise a carbon fiber composite material, the reed plate comprising:

a planar support area extending in a plane for connection to the reed, and an opening to allow a vibration of the reed, wherein the opening extends from the support area along a longitudinal axis up to an edge area of the opening opposite to the support area, wherein the reed plate is shaped in such a way that a distance is formed between the plane and the edge area in a direction perpendicular to the plane.

11. The sound post according to claim 10, wherein the sound post comprises a carbon fiber composite material.

12. The sound post according to claim 10, wherein the sound post, the reed plates, and the reeds are made of the same material.

13. A hand-pulled instrument with several reed plate arrangements the several reed plate arrangements comprising:

a reed plate for a hand-pulled instrument, wherein at least one reed is fixed to the reed plate and wherein the reed plate and the reed respectively comprise a carbon fiber composite material, the reed plate comprising:

a planar support area extending in a plane for connection to the reed, and an opening to allow a vibration of the reed, wherein the opening extends from the support area along a longitudinal axis up to an edge area of the opening opposite to the support area, wherein the reed plate is shaped in such a way that a distance is formed between the plane and the edge area in a direction perpendicular to the plane.

* * * * *